United States Patent [19]
Malvin

[11] 3,849,654
[45] Nov. 19, 1974

[54] FLUORESCENCE CUVETTE

[76] Inventor: Harry Herbert Malvin, 3315 Dakota Way, Las Vegas, Nev. 89109

[22] Filed: Oct. 19, 1973

[21] Appl. No.: 407,823

[52] U.S. Cl.................... 250/363, 250/361, 356/75
[51] Int. Cl............................................. G01j 3/00
[58] Field of Search...... 250/363, 368, 361; 356/75, 356/246

[56] References Cited
UNITED STATES PATENTS

| | | | |
|---|---|---|---|
| 2,605,672 | 8/1952 | Stamm | 356/75 |
| 2,779,230 | 1/1957 | White | 356/75 |
| 3,469,920 | 9/1969 | Dumartin | 356/75 |
| 3,734,601 | 5/1973 | Heiss | 250/363 |
| 3,761,715 | 9/1973 | Menzies | 250/363 |
| 3,769,516 | 10/1973 | Markle | 250/363 |

Primary Examiner—James W. Lawrence
Assistant Examiner—B. C. Anderson
Attorney, Agent, or Firm—Edward J. Quirk

[57] ABSTRACT

A fluorimeter cuvette is constructed with internal reflective surfaces such that the measured fluorescent radiation passing to the photodetector travels in the same direction as the direction of the exciting radiation entering the cuvette. As a result, fluorimetry measurements can be made in standard spectrophotometry equipment. The cuvette is also useful for nephelometry measurements.

6 Claims, 3 Drawing Figures

3,849,654

FLUORESCENCE CUVETTE

BACKGROUND OF THE INVENTION

This invention relates to a method and cuvette for measuring the fluorescent and/or light-scattering properties of materials. More particularly, it relates to a cuvette for determining fluorescence such that the incoming exciting radiation (also referred to as "incident radiation") and the emitted fluorescent radiation are measured along the same or parallel axes. This arrangement can allow conventional equipment for spectrophotometry analysis to be used to measure fluorimetric or nephelometric properties of solutions.

The fluorescent properties of many materials when exposed to radiation of certain wavelengths is well-known, and is commonly used to make quantitative and qualitative analyses of organic and inorganic materials. These tests can determine such factors as concentration, purity and product identification. In effecting these tests, a sample of the material to be tested, usually in the form of a solution or a suspension of solid particles in a liquid, is placed in a beam of the desired exciting radiation. The material fluoresces, and the fluorescence is measured by a detector such as a photoelectric cell. As a general rule, the intensity of fluorescence is a function of the intensity of the exciting radiation and the concentration of fluorescent material in the sample. The instrument can be calibrated by passing radiation of various intensities through samples of known concentration of fluorescent material. Certain corrections may be necessary; for example, Bray, U.S. Pat. No. 2,554,321 issued May 22, 1951, discloses a method of correcting the measurement of fluorescent energy for the amount of exciting radiation absorbed by the sample as it passes through the sample.

Fluorimeters are commonly constructed such that exciting radiation passes directly and without deflection through the cuvette, which is the sample holding cell. The fluorescent radiation is measured by a photocell (coupled to an appropriate current-measuring device, such as a potentiometer or galvanometer) located axially to the path of the exciting radiation. The fluorescent radiation is non-directional, being emitted in all directions, and can conveniently be measured on the side of the cuvette in the absence of interference from the exciting radiation, which is directional and passes along the length of the cuvette. Examples of fluorimetry systems wherein the fluorescence photocell is located axially to the exciting radiation passing to the cuvette are described in U.S. Pat. No. 2,554,321 mentioned above, and Leaf, U.S. Pat. No. 3,649,833, issued Mar. 14, 1972 which describes a self-contained submersible apparatus for measuring fluorescent properties of materials in an aqueous environment.

Nephelometry is a well-known technique for measuring the degree of turbidity of a suspension. When a beam of light strikes a turbid (cloudy) suspension, a portion of the light passes directly through either unscattered or by multiple scattering, and this portion is directly measurable by an in-line detector and meter. The remainder is scattered and rescattered in all directions by the suspended particles. Detector(s) placed in any other than an in-line position measure the amount of scattering through the arc monitored. For any given sector monitored, intensity is a function of number, size and shape of particles in the light path and the wave length of the incident radiation. Nephelometry is similar to fluorimetry in that the radiation which is measured departs the sample at an angle, generally perpendicularly, to the incident radiation. In the case of nephelometry, the measured radiation has the same wavelength as the incident radiation, whereas in fluorimetry, the measured radiation has a different wavelength.

Spectrophotometry is an analytical technique very similar to fluorimetry, in that radiation is passed through a sample contained in a cell or cuvette, and the radiation passing from the cuvette is measured by means of a photodetector coupled with a current measuring device. The exciting radiation is monochromatic, or nearly so, and is generated by means of a grating or prism. In spectrophotometry, measurements depend on the amount of radiation absorbed by a sample; in fluorimetry, however, the amount of radiation emitted, which is of a different wavelength than the exciting radiation, is measured. Since in spectrophotometry the measurement depends solely on the amount of radiation absorbed while passing through a sample, spectrophotometers are built on an "in line" basis, i.e., with the radiation striking the cuvette proceeding through the cuvette to the detection device without deflection. Fluorimeters, on the other hand, do not operate on an in-line basis; rather, as described above, the fluorescent radiation which impinges on the photodetector travels perpendicularly, or transversely, of the direction of the exciting radiation. The present invention allows equipment constructed solely for spectrophotometric analyses to also be used for fluorimetry and nephelometry, since the radiation measured travels in the same direction as the incident radiation.

SUMMARY OF THE INVENTION

This invention comprises a cuvette constructed in such a manner as to permit in-line fluorimetry and nephelometry, wherein the measured radiation impinging on the photodetector travels in the same direction as the exciting radiation travels to the cuvette. This is accomplished by having one or more reflective surfaces within the cuvette arranged to deflect the exciting radiation 90°, redirecting it through the sample cavity of the cuvette. Accordingly, the exciting radiation actually passes through the sample in a direction transverse to the direction in which the incident radiation strikes the cuvette.

DESCRIPTION OF PREFERRED EMBODIMENT

The cuvette of the invention will be described with regard to its use in fluorimetry, although it is useful for nephelometry or any other analytical technique where the measured radiation is emitted from a fluid sample axially to the direction of travel of the incident radiation through the sample.

Figure 1:
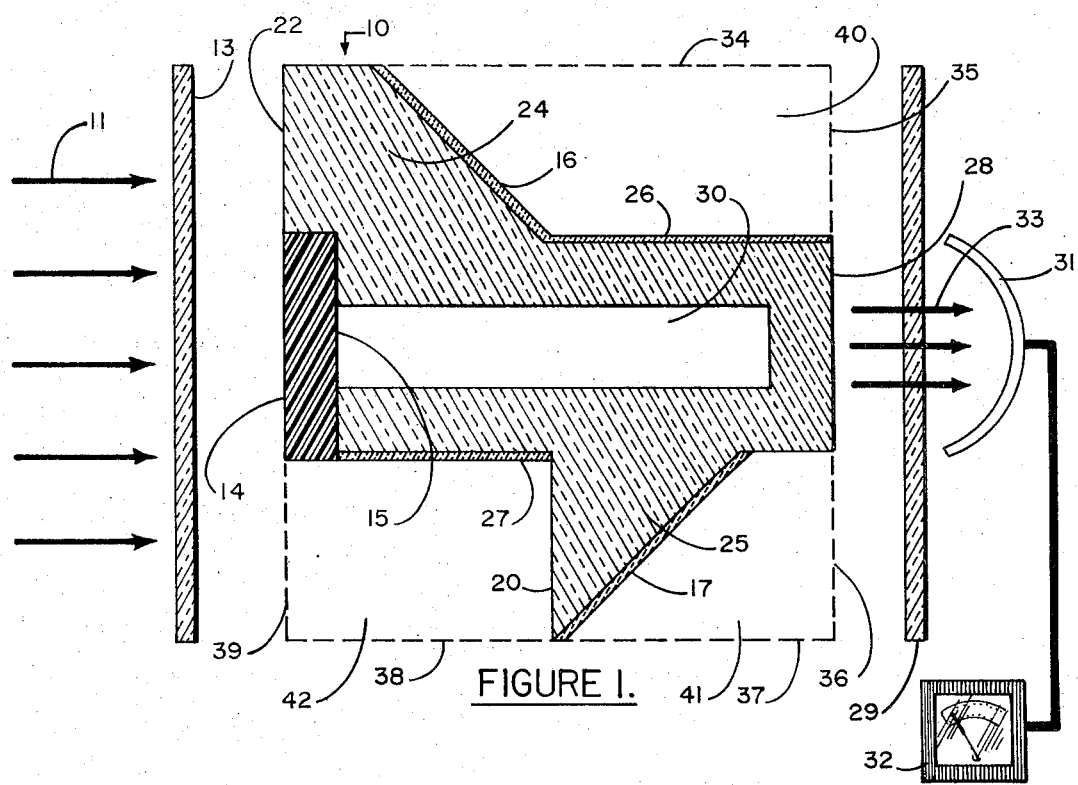
FIG. 1 is the top cross-sectional view of a cuvette fabricated according to the invention and showing the in-line mode of operation for fluorimetric analysis.

Referring to FIG. 1, exciting radiation 11, which may be produced monochromatically by e.g. a spectrophotometer or is filtered to the desired frequency through filter 13, is directed to and impinges upon the rearward walls of cuvette 10. If desired, filter 13 can be incorporated into the rear surface of the cuvette. The cuvette is fabricated from glass, quartz, or a synthetic plastic having appropriate characteristics, e.g. optical transparency and chemical resistance. The radiation passes through transparent surfaces 20 and 22, but is blocked by opaque shade 14 at the rearward surface 15 of sample cavity 30. The radiation passes through prismatic areas 24 and 25 to reflective surfaces 16 and 17, respectively, which are aligned at an angle of 45° to the incoming radiation. The incoming exciting radiation is deflected 90° at surfaces 16 and 17 and into sample cavity 30. In a preferred embodiment of the invention, the side walls of the cuvette are constructed with reflective surfaces 26 and 27 which reflect the exciting radiation back through the sample cavity, thereby increasing the efficiency of the device. Any reflective coating such as silver or aluminum can be used to make the surface reflective.

As the specimen in sample cavity 30 is excited, secondary fluorescent radiation is emitted in all directions. Some of the secondary radiation 33 passes through transparent forward exit window 28 and auxiliary filter 29, which filters out any stray radiation other than the fluorescent radiation. In a preferred embodiment, exit window 28 is fabricated from a material which selectively passes the fluorescent radiation, eliminating the need for auxiliary filter 29. The fluorescent radiation then passes to photodetector 31, which produces an electrical current proportional to the intensity of the radiation, and which is coupled to current-measuring device 32. In another preferred embodiment of the invention, the inner surface of the rear wall of the sample cavity has a reflective coating to reflect fluorescent radiation generated toward the rear of the sample cavity such that this radiation will then pass out through the transparent forward wall and to the photodetector. This additional reflective surface also increases the efficiency of the cuvette and the sensitivity of the apparatus. The rear opaque wall of the sample cavity may be fabricated from an opaque material, or the opaque property of the surface may be provided by attaching an opaque material, such as an optically impervious plastic tape.

As shown in the FIG. 1, light enters the cuvette on either side of opaque shade 14, which prohibits light from entering the sample cavity which is centrally located in the cuvette. However, it is within the scope of the invention to locate the sample cavity toward one side of the rear of the cuvette, with all of the light entering on the other side of the rear of the cuvette.

In FIG. 1, dashed lines 34, 35, 36, 37, 38, and 39 represent optional extensions of the external surfaces of the cuvette. These surfaces are not necessary for the cuvette to function, but provide a more standard shape to the outside of the cuvette, enabling it to be handled more easily and to be easily adapted to fit into existing instruments. Areas enclosed by these surfaces, designated as 40 and 41 are simply structural and may be fabricated from any structural material; however, the material in section 42 is optically important and should consist of the same material as prismatic area 25. If desired, construction may be in one or more parts; for example, sections 40 and 41 may be separately constructed.

Figure 2:
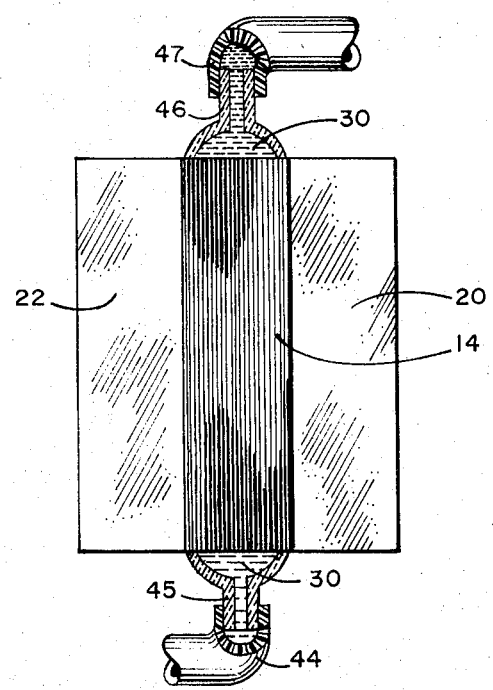
FIG. 2 shows the cuvette adapted with inlet and outlet channels for the liquid sample so that the cuvette can be used continuously.

FIG. 2 shows a rear view of cuvette 10 adapted for continuous flow of fluid samples through the cuvette. Fluid enters the cuvette through flexible tubing 44 which is connected to sample inlet 45. The fluid passes through sample cavity 30 and exits through sample exit 46 and flexible tubing 47. Operation may be continuous, or, by using standard valving and pumping arrangements, samples may be intermittently pumped in and out of the cuvette, with intermediate flushing if desired.

Figure 3:
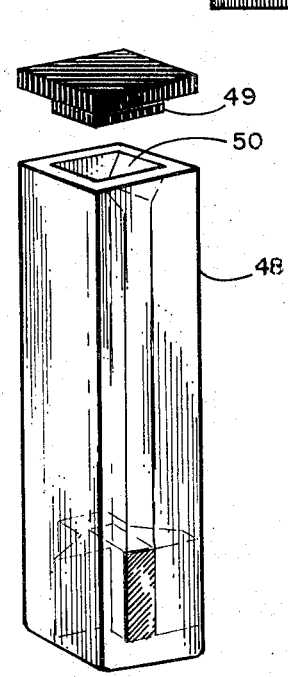
FIG. 3 shows the cuvette adapted for batch use.

FIG. 3 indicates cuvette 48 adapted for batch use, with the opening 50 in the top of the cuvette adapted for closing by top 49. The cuvette is then filled manually, e.g., by pipette.

These and other advantages of the invention described herein will be apparent to those skilled in the art.

I claim as my invention:

1. A cuvette comprising a cavity for receiving a fluid sample to be activated by incoming incident radiation, said cavity defined by confronting rearward and forward end walls spaced from each other in the direction of the incoming incident radiation and side walls therebetween, the rearward end wall being entirely opaque to incoming incident radiation and the forward wall being transparent to radiation scattered or emitted by said fluid sample, reflective surface means located external to and in fixed relationship to said cavity for reflecting said radiation at a 90° angle relative to the direction of the incoming radiation incident on the relecting surface, and means in said cavity for inserting and withdrawing a fluid sample.

2. The cuvette of claim 1 wherein the inner surface of the opaque rearward end wall of the cavity is reflective to radiation scattered or emitted by said fluid sample.

3. The cuvette of claim 1 wherein said cavity has a fluid inlet, and a fluid outlet spaced from said fluid inlet to allow continuous flow of fluid through said cavity.

4. A method of measuring the light generating or light scattering properties of a fluid sample comprising passing incoming radiation prior to passing through the sample to a reflective surface situated to reflect the radiation at a 90° angle relative to the direction of the incoming radiation incident on the reflective surface, passing the reflected radiation through the fluid sample, and measuring the intensity of radiation emitted from the sample along an axis parallel to the incoming exciting radiation.

5. The method of claim 4 wherein the exciting radiation which has passed through the fluid sample is reflected and passed back through the sample parallel to the direction of first passage of the exciting radiation through the sample.

6. The method of claim 4 wherein the radiation emitted from the sample is fluorescent radiation having a wavelength different from the incoming radiation.

* * * * *